United States Patent [19]

Hodlewsky

[11] Patent Number: 4,821,869
[45] Date of Patent: Apr. 18, 1989

[54] LOW BACKLINE PRESSURE CHAIN FOR USE WITH TRANSFER PLATE

[75] Inventor: William G. Hodlewsky, Greendale, Wis.

[73] Assignee: Rexnord Inc., Brookfield, Wis.

[21] Appl. No.: 123,782

[22] Filed: Nov. 23, 1987

[51] Int. Cl.⁴ .............................. B65G 17/24
[52] U.S. Cl. ............................ 198/779; 198/635
[58] Field of Search .......... 198/635, 779, 852, 853

[56] References Cited

U.S. PATENT DOCUMENTS

| | | | |
|---|---|---|---|
| 3,080,955 | 3/1963 | Fennell | 198/779 |
| 3,202,260 | 8/1965 | Wolf | 198/635 |
| 3,550,756 | 12/1970 | Kornylak | 198/779 |
| 4,171,045 | 10/1979 | Lapeyre | 198/635 |

FOREIGN PATENT DOCUMENTS

| | | | |
|---|---|---|---|
| 66530 | 12/1982 | European Pat. Off. | 198/853 |
| 238150 | 9/1987 | European Pat. Off. | 198/779 |

*Primary Examiner*—Joseph E. Valenza
*Attorney, Agent, or Firm*—Michael, Best & Friedrich

[57] ABSTRACT

Chain links for forming a conveyor each chain link including a base portion having shaft support members extending upwardly from its top surface and shafts supported between the shaft support members. A plurality of rollers are mounted on each shaft, the rollers including a larger diameter portion and a smaller diameter portion the smaller diameter portions of the rollers defining grooves in the upper article supporting surface of the rollers, the grooves being adapted to house fingers of a fingered transfer plate.

4 Claims, 1 Drawing Sheet

U.S. Patent  Apr. 18, 1989  4,821,869
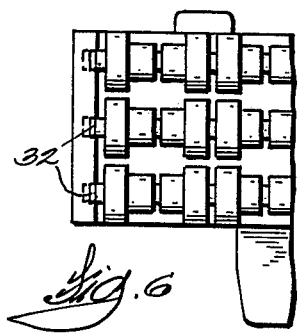
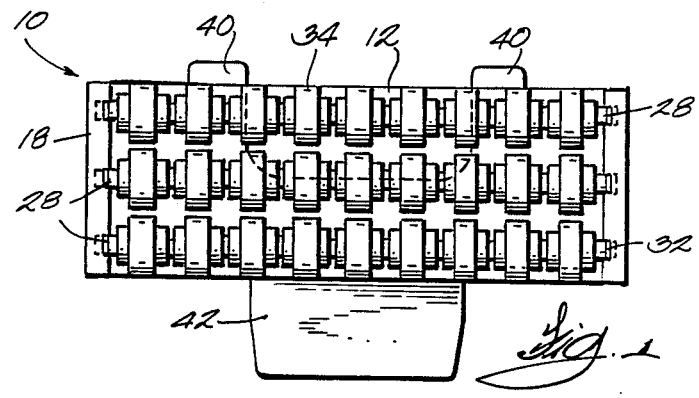
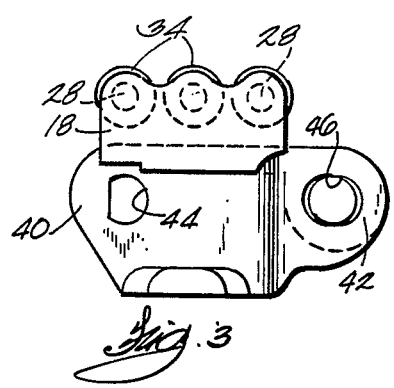
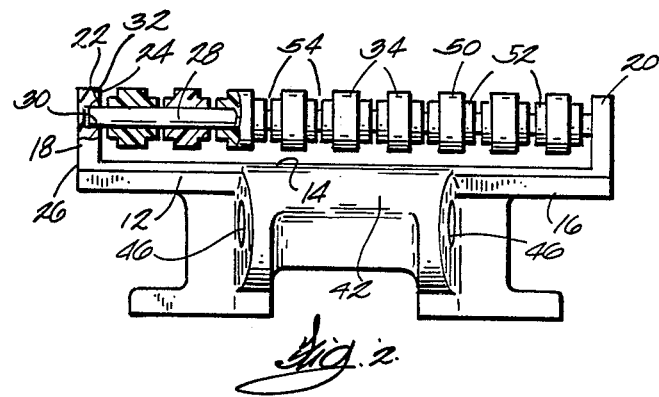
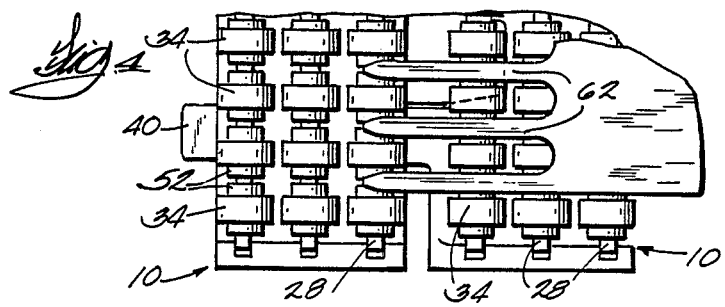
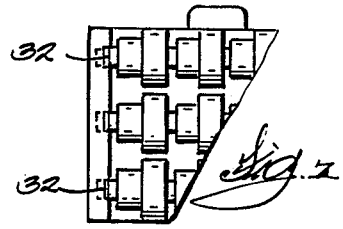
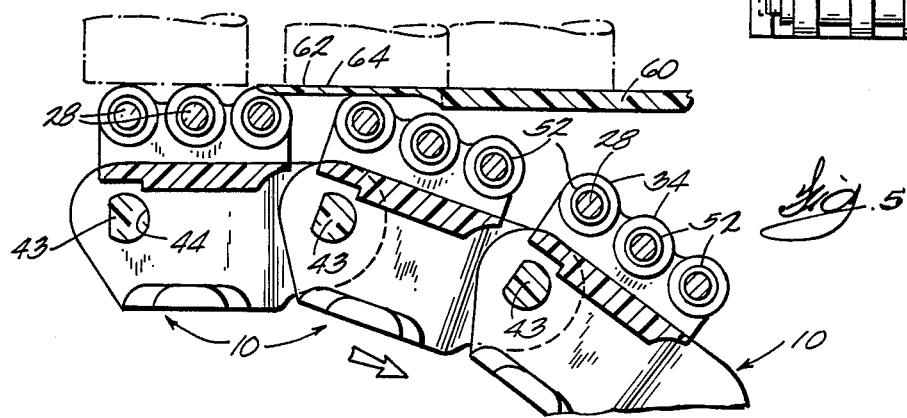

LOW BACKLINE PRESSURE CHAIN FOR USE WITH TRANSFER PLATE

BACKGROUND OF THE INVENTION

This invention relates to conveyor chain links and, more particularly, to chain links adapted for use with a fingered transfer plate.

Typically when a flat plate chain is used in conjunction with a transfer plate, there is a gap between the chain and the transfer plate. This gap may cause articles being carried on the top surface of the chain to tip or jam up at the point of transfer to the transfer plate. Fingered transfer plates have been used in the past as a solution to this problem. Examples of conveyor chains which can be used with transfer plates in various transfer plate configurations are illustrated in the Hodlewsky et al. U.S. Pat. No. 4,438,838, issued Mar. 27, 1984; and the Lapeyre U.S. Pat. No. 4,051,949, issued Oct. 4, 1977.

Additionally, when transporting articles by means of a conveyor there are many instances in which the articles will back up or accumulate on the conveyor. When the articles accumulate, they push against each other building up backline pressure. A large backline pressure is unacceptable when the articles being carried by the conveyor are fragile because the force of the articles pushing against each other may damage them. The backline pressure also puts an extra load on the conveyor and the conveyor sprockets and causes sliding friction and abrasion of the conveyor. A low backline pressure chain intended to overcome these deficiencies is illustrated in European Patent No. 066,530, published Aug. 28, 1985, that patent application being assigned to the assignee of the present invention.

SUMMARY OF THE INVENTION

The present invention is directed to a low backline pressure chain having a configuration and construction which facilitates use of the chain with a fingered transfer plate and wherein the chain can be manufactured economically. One of the features of the invention is that the components of the chain for use with the fingered transfer plate can be molded in the same molds as used to mold a conventional low backline pressure chain with the exception of the mold used to manufacture the rollers. Accordingly, only a single additional mold is required.

More particularly, the invention includes a chain link conveyor assembly including a plurality of chain links each having a base portion with first and second shaft support members extending upwardly from the top surface of the base portion, and at least one shaft extending between and supported by the shaft support members. A plurality of rollers are mounted for rotation on the shaft, each of the rollers including a first cylindrical portion having a first diameter and a second cylindrical portion having a second diameter less than the first cylindrical portion, and the rollers defining an article support surface. The chain link conveyor assembly also includes a transfer plate for removing articles from the chain link conveyor, the transfer plate including a generally planar upper surface generally coplanar with the article supporting surface defined by the rollers and a plurality of spaced apart parallel fingers extending between the first cylindrical portions of the rollers.

In one embodiment of the invention each of the said rollers includes a central portion forming the larger diameter cylindrical portion and at least one of the opposite ends of the roller define the smaller diameter cylindrical portion.

Various other features and advantages of the invention will be apparent by reference to the following description of the preferred embodiment, from the drawings and from the claims.

BRIEF DESCRIPTION OF THE DRAWINGS

FIG. 1 is a plan view of a chain link embodying the invention.

FIG. 2 is an elevation view of the chain link illustrated in FIG. 1 and partially in cross section.

FIG. 3 is an end view of the chain link illustrated in FIGS. 1 and 2.

FIG. 4 is a plan view of chain links of the type shown in FIG. 1 and used with a transfer plate.

FIG. 5 is an elevation view of the apparatus illustrated in FIG. 4.

FIG. 6 is a partial view similar to FIG. 1 and showing an alternative embodiment of the invention.

FIG. 7 is a view similar to FIG. 6 and showing another alternative embodiment of the invention.

FIG. 8 is a view similar to FIGS. 6 and 7 showing a further alternative embodiment of the invention.

Before describing a preferred embodiment of the invention in detail, it is to be understood that the invention is not limited to the details of construction and to the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in FIGS. 1-3 is a chain link 10 embodying the invention and including a generally flat base portion 12 having a top surface 14 and a bottom surface 16. First and second shaft support members 18 and 20 extend upwardly from the opposite ends of the flat base portion 12, the shaft support members 18 and 20 being integral with the base portion. Each shaft support member 18 and 20 has a top surface 22, an inside surface 24 and an outside surface 26. The inside surface 24 has means for mounting a shaft 28, this means including an inwardly opening cavity 30 having the shape of a cylindrical indentation. In the particular embodiment of the invention shown in the drawings, each shaft support member is provided with three spaced apart cylindrical indentations 30 in its inside surface, but in other configurations, the chain link could be provided with more or fewer indentations 30. The provision of the receptacles 30 in the shaft support members permits the mounting of three shafts 28 in each link.

Each shaft support member 18 and 20 also includes a ramp 32 leading from its top surface 22 to each cylindrical indentation 30 to facilitate insertion of the ends of the shafts 28 into the receptacles 30. The outside surface 26 of the shaft support members is smooth, flush with the end of the flat base portion 12 and has no perforations. This smooth, flush surface makes it possible for two chains made up of links to run side by side to provide a broad continuous conveying surface. Each shaft 20 is mounted in opposed cylindrical indentations in the first and second shaft support members 18 and 20 such that each shaft has one end mounted in the first shaft support member and the other end mounted in the second shaft support member. It is preferable that the shafts not rotate relative to the cylindrical indentations. One or both ends of the shafts may be knurled so as to avoid such rotation.

A plurality of rollers 34 are mounted on each shaft. The rollers each include a central bore having a diameter slightly larger than the outer diameter of the shafts 28 so that the rollers 34 may rotate freely on the shafts 28. The rollers 34 have a relatively short length so that any bending or deflection of the shaft 28 will be less likely to cause freezing of the rollers 34 on the shaft 28 than would be the case if the rollers were longer, and so that the rollers can be easily cleaned of any dirt which would tend to bind the roller on the shaft. In the preferred form of the invention, each roller will have a length in the range from approximately one-half to one times the outside diameter of the roller. If the rollers are shorter, it becomes expensive to manufacture the large number of rollers required for each shaft and to assemble the rollers on the shaft. If the rollers are longer, it becomes more difficult to clean the rollers, and it is more likely that the rollers 34 will freeze on the shaft 28 if there is any bending of the shaft during operation of the chain link. Additionally, it is desirable that the rollers 34 have a relatively small outer diameter in order to reduce the amount of discontinuity between the rollers to thereby provide a continuous supporting surface such that even small articles will not tip over when supported by the upper surface of the chain links 10. However, the ratio of the outer diameter of the roller to its inner diameter must be sufficient that friction between the article being conveyed and the roller on which it sits will cause the roller to turn. In one form of the invention it has been found that a ratio of outer diameter to inner diameter of the roller may be conveniently in the range of 2.3 to 5. Also, the outside diameter of the roller which provides optimum continuity of the conveying surface is approximately in the range of 0.4 to 0.6 inches. The rollers 34 do not fit tightly against each other on the shafts 28, but rather have a spacing which permits the rollers to slide axially a short distance along the shafts to aid in cleaning and to reduce the amount of friction exerted on a roller by adjacent rollers.

The lower or flat base portion 12 of the chain links 10 includes a bottom surface 16, and it can be seen that there are a plurality of barrel or eye portions 40 and 42 extending from and integral with the flat base portion 12. In the illustrated arrangement there are two barrel portions 40 at one end of the chain link and a single barrel portion 42 at the other end of the chain link. In order to form a chain, the single barrel portion 42 at one end of the chain link fits into the space between the two barrel portions 40 on the adjacent link, and a pin 43 (FIG. 5) is inserted through apertures 44 and 46, respectively, extending through the three adjacent barrel portions. Other known barrel arrangements, using different numbers of barrels may be provided.

In the illustrated arrangement, the flat base portion 12, the barrel portions 40 and 42 and the first and second shaft support members 18 and 20 are all formed as a single polymeric piece. In one form of the invention, the shafts 28 are made of metal, and the rollers 34 are molded polymeric material. It should be readily understood by those skilled in the art that while these materials are preferred, other materials could also be used in the manufacture of the chain links.

In assembly of the link 10, the rollers 34 are slipped over the shaft 28 in end to end relationship and the ends of the shaft 28 are then placed on corresponding ramps 32 of the first and second shaft support members 18 and 20. The shafts 28 are pushed down the ramps 32 gradually separating the first and second shaft support members 18 and 20. The ends of the shafts will then snap into the indentations 30 provided in the first and second shaft support members.

In the embodiment of the invention illustrated in FIGS. 1-5, each roller 34 includes a central large diameter portion 50 and hub portions 52 at opposite ends of the roller. The hub portions are of reduced diameter when compared to the central larger portions 50, and such that when the rollers are stacked on the shaft, adjacent rollers will define a series of lengthwise straight tracking slots or grooves 54 formed in the top surface of the conveyor chain. In the drawings, the widths of the slots or grooves 54 are exaggerated for convenience of illustration, and the spacings between the rollers 34 are also exaggerated.

The conveyor chain assembly also includes a transfer plate 60 having a plurality of spaced apart parallel fingers 62 projecting toward the chain links and in a direction opposite to the direction of movement of the chain links. The fingers 62 and the transfer plate 60 include a generally planar upper surface 64 generally coplanar with the top of the conveyor chain, the fingers 62 being adapted to be housed in the slots 54 formed by the reduced diameter portions 52 of the rollers 34.

While in the arrangement illustrated in FIGS. 1-5, the reduced diameter portions of each roller are at the opposite ends of the roller, in other arrangements reduced the diameter portions could be located at only one end of the roller as illustrated in FIGS. 6 and 7 or centrally of the rollers as illustrated in FIG. 8 wherein the rollers are provided with multiple reduced diameter portions, and the fingers of the transfer plate can have a configuration so as to be housed in the grooves defined by the reduced diameter portions. An advantage of providing reduced diameter portions at the ends of the rollers is that construction of the molds for use in molding the rollers can have a less complicated construction if the reduced diameter portions are at the ends of the rollers.

Various features of the invention are set forth in the following claims.

I claim:

1. A conveyor assembly comprising:
   a chain link conveyor including a plurality of chain links joined together to form a continuous chain, each chain link including
   a base portion having top and bottom surfaces,
   first and second shaft support members extending upwardly from the top surface of the base portion, each shaft support member including means for supporting a shaft,
   at least one shaft extending between the first and second shaft support members, and supported by the shaft support members,
   a plurality of rollers mounted for rotation on the shaft, each of said rollers including a first cylindrical portion having a first diameter and a second cylindrical portion having a second diameter less than the first diameter of the first cylindrical portion, and the first cylindrical portions of the rollers defining an article support surface, and the second diameter portions of the plurality of rollers defining grooves between the first diameter portions and adapted to house fingers of a fingered transfer plate, a transfer plate for removing articles from the chain link conveyor, the transfer plate including a generally planar upper surface generally coplanar with the article supporting surface defined by the first cylindrical portions of the rollers, and a plurality of spaced apart parallel fingers extending between the first cylindrical portions of the rollers and housed in the grooves defined by the second diameter portions of the plurality of rollers.

2. A conveyor chain as set forth in claim 1 wherein each of said rollers includes opposite ends, and wherein each of said rollers includes a central portion forming said first cylindrical portion and at least one of said opposite ends defining said second cylindrical portion.

3. A conveyor chain as set forth in claim 1 wherein each of said rollers includes a central groove extending circumferentially around the roller.

4. A conveyor chain as set forth in claim 1 wherein the opposite ends of the roller have a diameter less than the diameter of the central portion of the roller.

* * * * *